July 29, 1930.   R. B. PRENTICE   1,771,722

SAW

Filed June 15, 1929   2 Sheets-Sheet 1

Inventor

Rudolph B. Prentice

July 29, 1930.   R. B. PRENTICE   1,771,722
SAW
Filed June 15, 1929    2 Sheets-Sheet 2
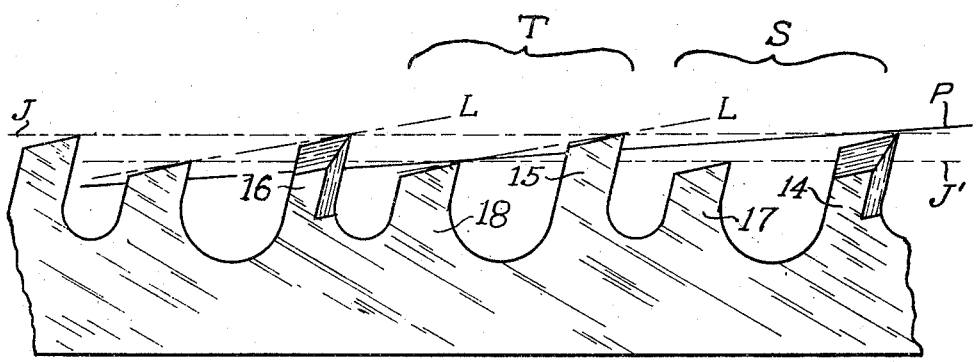
Fig. 8
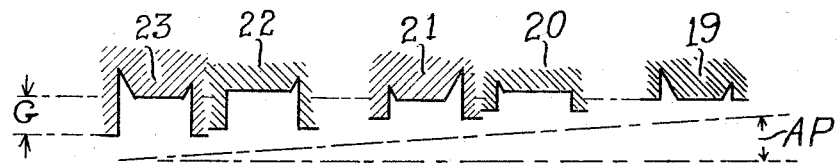
Fig. 9
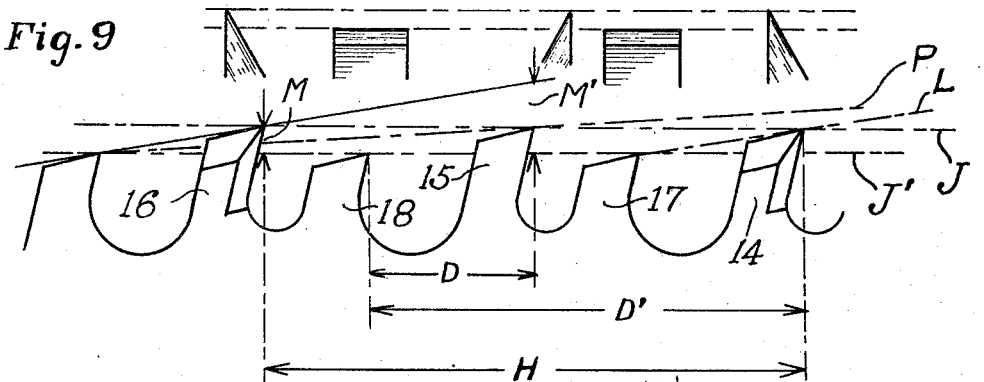
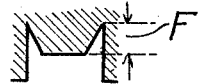
Fig. 10
Fig. 11
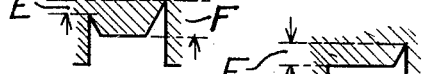
Fig. 12     Fig. 13
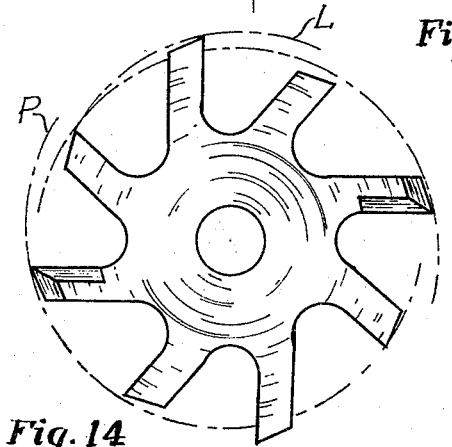
Fig. 14
Inventor
Rudolph B. Prentice Patented July 29, 1930

1,771,722

UNITED STATES PATENT OFFICE

RUDOLPH B. PRENTICE, OF PORTLAND, OREGON

SAW

Application filed June 15, 1929. Serial No. 371,141.

My invention relates to improvements in saws in which a group of teeth are formed and aligned so as to perform complementary operations.

The principal object of my invention is to adapt such saws to efficient operation at several rates of feed, or at variable or irregular rates of feed such as attend the feeding of stock by hand.

A second object of my invention is to render the fitting of such saws less critical.

A third and incidental object is the provision of certain inherent adjustment of the pitch of such a saw to the work in which it is being used.

A fourth object is to provide for the cooperation of certain of the teeth in each group with those of succeeding groups to the end that a saw of this type in which my invention is embodied is less vulnerable to accidental impacts.

Other objects and advantages of my invention are apparent in the following discourse wherein the significance of the reference numerals in the accompanying drawings, details of construction and operation of a typical saw embodying the invention, and its particular utility are explained.

Figure 1:
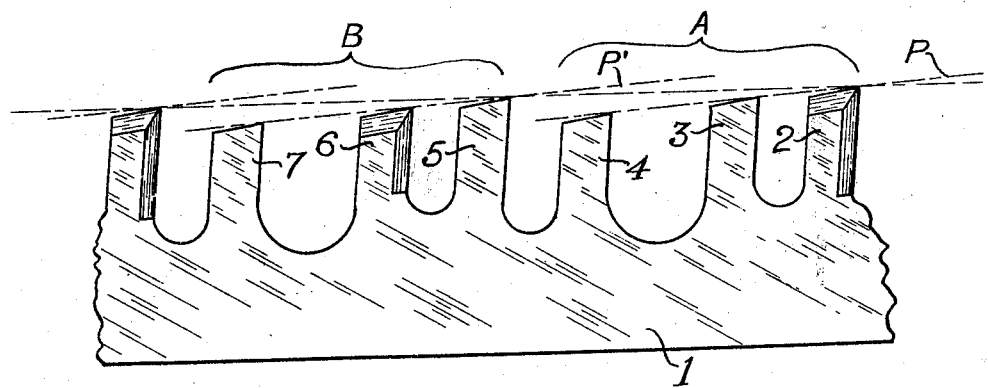
Figure 1 represents a portion of a straight saw in elevation.
Figure 2:
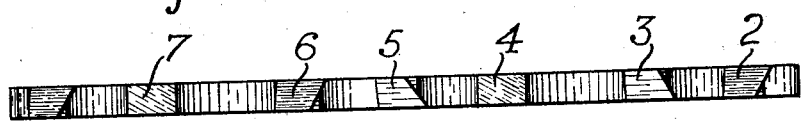
Figure 2 represents a view of the toothed edge of said portion.

Figures 4, 5, 6, and 7 represent the forms of the kerf made by the saw in several different phases of operation.

Figure 8 represents a fragment of a straight saw in which my invention is embodied in an entirely new form.

Figure 9 is a diagram illustration of certain properties of the saw of my invention described further on.

Figures 10, 11, 12, and 13 are diagrams illustrative of certain operating characteristics described latterly.

Figure 14 represents a circular saw of entirely unique form embodying my invention.

The reference numeral 1 indicates a fragment of a straight saw blade gummed out to form the several varieties of teeth comprised within two adjacent groups A and B which together constitute one cycle of teeth of the saw herein described.

With reference to Figure 1, a first tooth 2 of the complementary group A is sharpened upon the reverse side. A second tooth 3, aligned with the first tooth 2 upon the pitch line P is sharpened upon the obverse side. The third tooth 4 of this group A, also aligned with the other two upon the pitch line P and before which is a large gullet, is sharpened transversely; all in the usual manner of fitting a complementary group of teeth of such a saw.

However, the first tooth 5 of the complementary group B is sharpened upon the obverse side in contradistinction to the sharpening of the first tooth 2 of the group A which is sharpened upon the reverse side. Likewise, the second side cutter 6, aligned with the first side cutter 5 of the group B upon the pitch line P', is sharpened upon the opposite side to that upon which the second tooth 3 of the group A is sharpened, that is, the reverse side. The third or raker tooth 7 of the group B is similar to that of the group A indicated by the numeral 4.

The whole cutting edge of the saw is thus formed by succeeding cycles of teeth each of which comprises two complementary groups individually aligned upon their respective pitch lines and whose side cutting teeth of similar position in adjacent groups are sharpened upon opposite sides.

Figure 3:
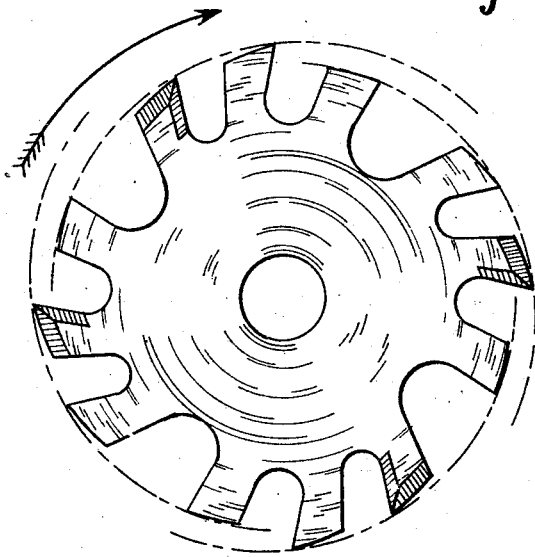
Figure 3 represents a circular saw in elevation.

A similar arrangement of teeth and complementary groups adapted to circular saws is illustrated in Figure 3. It will be apparent from this figure that an even number of complementary groups, or an integral number of cycles of teeth, is required to furnish a continuous succession of teeth in this manner of arrangement.

Figure 4:
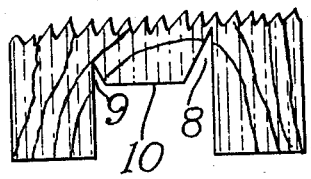

Figure 4 illustrates the appearance of the end of a stick of wood held stationary during the passage therethrough of one complementary group of teeth whose first side cutter passed through at 8, whose second side cutter passed through at 9, and whose raker passed through at 10.

Figure 5:
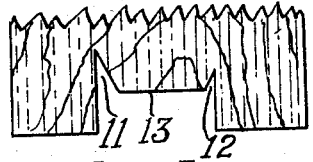

Figure 5 illustrates the appearance of a stick of wood held stationary during the passage therethrough of an oppositely sharpened complementary group of teeth whose first side cutter passed through at 11, the second at 12, and the raker at 13.

If two adjacent and oppositely sharpened complementary groups, or one complete cycle of teeth of the saw of my invention, pass through a stationary stick, the lateral advance projections of the kerf therein will be of equal magnitude since both are made by first side cutting teeth oppositely sharpened.

In virtue of this the saw blade is deflected to opposite sides alternately by the superior transversely acting forces accruing out of the deeper penetration of these first teeth whose the direction of motion of the saw. Hence exterior sides only lie in the same plane with if the saw be not fed at the rate for which the disposition of the pitch lines with reference to the direction of motion of the saw was calculated, but at some rate less than that, there will be no tendency for the saw to lead off to one side or the other accruing out of a deeper penetration on one side.

The virtue of saws of this type lies chiefly in the superior thermal capacity of the complementary group of teeth as compared with that of the single bits in ordinary saws intended to cut the bottom, and walls of the kerf simultaneously, and as related to the ability of useable steels to conduct away the heat generated by the friction of the teeth with the wood; but their purpose is defeated when operated at too slow rates of feed when the raker teeth of the complementary groups do not excise all of the kerf wood divided from the stock by the side cutters. At these slower rates of feed it will be apparent that the first teeth in the groups are continuously traveling through deep grooves the greater portion of which have been previously cut and whose temperature is by this undue friction excessive and destructive of the temper of steel.

Now, with the number of groups of teeth passing through the work remaining constant, if the rate of feed be considered to be very slow, the placement of the first teeth of the groups upon alternate sides of the saw provides for two important effects: firstly, the number of teeth passing through each deep groove, for there will now be a deep groove on both sides of the kerf, will be halved, and the heat of friction likewise halved; secondly, double the quantity of wood to be acted upon by the heat of friction is presented, and the ultimate temperature of the wood resulting from such friction will be greatly diminished, and, hence, the teeth will be spared from destructive temperatures.

In the ordinary saw of this type wherein the first teeth of complementary groups penetrate deeper on one side at any rate of feed less than that for which it is fitted, the first teeth in each group of the saw of my invention penetrate equally on both sides at slow rates of feed and thus provide for the fair running of the saw at any rate of feed.

Figure 6:
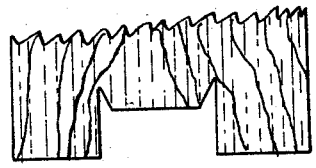
Figure 7:
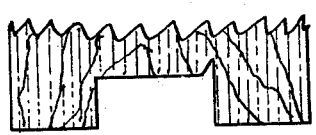

Figures 6 and 7 represent the figures of the advancing kerf at slow and maximum rates of feed respectively with the saw of my invention.

It will be apparent from the foregoing that the angle included between the pitch line and the direction of motion of the saw need not be exactly adjusted to the rate of feed contemplated for its use, and that the saw may be fitted well enough for satisfactory work without the use of fine measuring instruments and critical workmanship.

It being practicable to operate the saw of my invention at slower speeds than that for which the pitch is calculated, a distinct advantage is gained by fitting the saws for a higher rate of feed than that for which they are to be used when the stock to be sawn is fouled with nails or abrasive glues and the like. This advantage accrues out of the reduced frequency of the necessity for fitting the saw, and hence a more nearly continuous operation of the machine on which it is used.

If a first tooth in any group be mutilated by contact with foreign matter, the function of that tooth will be assumed by the next succeeding tooth upon that side which will be a second tooth in the group next following. It being assumed that the saw is being operated under speed, the stock will not have advanced to that point where the raker tooth of the impaired group will strike deeper than the cut made by the second tooth of the group preceding the impaired group,—nor yet so far as will unduly burden the tooth taking up the function.

This peculiarity is an effect of the embodiment of my invention in saws having the usual number and arrangement of complementary groups of teeth aligned with reference to a pitch line generated upon the tool by a fixed point in the stock being cut when both the stock and the saw are in relative operative motion. But, my invention is capable of embodiment in saws whose complementary groups are not aligned with reference to a pitch line so generated, but with reference to pitch lines subtending angles of approximately two and one-half times this magnitude, providing for certain properties and effects of great value in the art. And it is in these latter effects and properties in which consists the essence of my invention, and of which a preferred form of embodiment is represented by the tool illustrated in Figure 8.

In this figure, a reverse side cutter 14 is aligned upon the joint line J whereupon are also aligned the succeeding obverse side cutter 15, and reverse side cutter 16. Two raker teeth 17 and 18 in the fragment represented are aligned upon a second joint line J′ parallel with the first joint line J but not so remotely situated from the body of the saw, so that all of the side cutters shall be of equal length but sharpened on alternate sides, and all raker teeth shall be of equal length but shorter than the side cutters.

Now, in this arrangement two related values are apparent in the aspect of the tool. If a line L joining the two most remote points of two succeeding teeth be produced beyond the saw teeth and a pitch line P, generated upon the saw by a fixed point in the stock when both the saw and stock are in relative operative motion at maximum rates of speed, be similarly produced, the two angles subtended to the joint lines will bear a ratio determined by the ratio of the distance D to the distance D′ according to the laws of trigonometry, whilst the ratio of the distances M and M′, $\frac{M}{M'}$ will vary directly as $\frac{D}{D'}$.

In Figure 9 this relationship is illustrated graphically wherein the angle of pitch AP and the numerals 19, 20, 21, and 22 representing successive positions of the advancing extremity of the kerf are apposed. The distance G represents the magnitude of the motion of the stock being fed at the maximum rate during the time measured by the movement of the saw blade through the distance H in Figure 9.

The contours of the advancing extremity of the kerf produced by a tool whose teeth are aligned in accordance with my invention in the manner lastly described will have characteristic forms with varying rates of feed represented in several degrees between very slow and maximum rates of feed, by the Figures 10, 11, 12, and 13 respectively wherein the dimensions E and F are shown to diminish as the maximum feed is approached.

Figure 14 represents a circular saw the alignment of whose teeth embodies my invention.

It will be apparent that in this latterly described form, the cycles of teeth overlap, and the side cutting teeth aligned upon the same lines as L with the raker teeth, cooperate with succeeding and oppositely sharpened side cutters situated in succeeding groups of teeth as S and T. Thus the pitch line P disposed across one complete cycle of teeth encompasses one group of teeth as T and the side cutter 14 of the group S, whilst the raker tooth in the group S has no function in this cycle, but only in the preceding cycle which also includes the side cutter 14.

Thus, the side cutting teeth have functions in two succeeding cycles in contradistinction to the raker teeth which have a function in but one cycle.

In consequence of this duplicity of function of the side cutters an economy of peripheral space is effected affording an opportunity to allot a greater portion of the whole thereof to gullet space before the rakers than is possible when both side cutters are aligned with a raker upon a pitch line generated upon the saw by a fixed point in the stock being cut when both saw and stock are in relative operative motion.

It is to be also noticed that this saw allows of a great variation in the rate of feed and operates with high efficiency when fed irregularly as by hand.

It is also apparent that the fitting of the saw of my invention is a comparatively simple process.

Having described my invention what I claim is:

1. A saw provided with side cutting teeth sharpened on alternate sides and of equal length, and shorter raker teeth of equal length interposed between said side cutting teeth.

2. A saw provided with symmetrical pairs of groups of teeth arranged in succession said pairs of groups being each composed of two groups comprising individually a side cutting tooth and a raker tooth of shorter length than said side cutting teeth and in which the said side cutting teeth are sharpened upon alternate sides.

3. A cycle saw comprising a succession of pairs of groups of teeth, adjacent groups of which are each composed of one raker tooth and one side cutting tooth sharpened on the opposite side to that upon which the adjacent side cutter is sharpened and in which a cycle of teeth performing complementary cutting operations comprises both teeth of one of said groups and the side cutter of the said adjacent group.

4. A cycle saw comprising a succession of pairs of groups of teeth adjacent groups of which are each composed of one raker tooth and one side cutting tooth sharpened on the opposite side to that upon which the adjacent side cutter is sharpened and in which a cycle of teeth performing complementary cutting operations comprises both teeth of one of said groups and the side cutter of the said adjacent group, and further formed in detail so that all side cutting teeth shall be of equal length and all raker teeth shall be of the same length but shorter than said side cutting teeth.

5. A cycle saw comprising a succession of pairs of groups of teeth adjacent groups of which are each composed of one raker tooth and one side cutting tooth sharpened on the opposite side to that upon which the adjacent side cutter is sharpened and in which a cycle of teeth performing complementary cutting operations comprises both teeth of one of said groups and the side cutter of the said adjacent group; and in which the side cutter and raker constituting each group are aligned upon a line subtending to the joint line a greater angle than is subtended by a pitch line generated upon the saw by a fixed point in the stock being cut when the saw and stock are in relative operative motion.

6. A cycle saw comprising a succession of pairs of groups of teeth adjacent groups of which are each composed of one raker tooth and one side cutting tooth sharpened on the opposite side to that upon which the adjacent side cutter is sharpened and in which a cycle of teeth performing complementary cutting operations comprises both teeth of one of said groups and the side cutter of the said adjacent group, and wherein the said two teeth of each of said groups are aligned upon lines subtending that angle to the joint line whose tangent is as much greater than that of the angle subtended thereto by the pitch line generated upon the saw by a fixed point in the stock being cut when both the saw and the stock are in relative operative motion upon which the first and last teeth of a cycle of complementary cutters are aligned, as the adjacent side of the second angle is greater than the adjacent side of the first angle and wherein the magnitudes of the opposite sides of both angles perpendicular to the joint lines are equal.

7. A saw provided with a succession of groups of teeth each group of which is adapted to perform complementary cutting operations in which the teeth comprised in each group are aligned upon a pitch line generated upon the saw by a fixed point in the stock being cut when both the saw and the stock are in relative operative motion and wherein the first teeth of the said groups are sharpened upon alternate sides.

8. A saw comprising a series of an equal number of side cutting teeth of equal length and shorter raker teeth of equal length arranged upon a blade alternately in which the side cutting teeth are sharpened on alternate sides and in which those teeth constituting a cycle performing complementary cutting operations comprise two side cutting teeth between which is situated the raker tooth of the preceding cycle and an adjacent raker tooth.

RUDOLPH B. PRENTICE.